Figure 1:
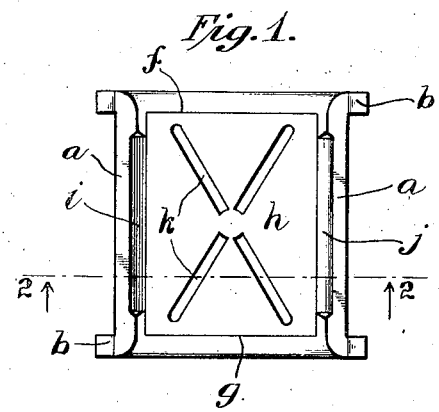

H. H. DOEHLER.
BEARING.
APPLICATION FILED JUNE 12, 1912.

1,121,904.                                    Patented Dec. 22, 1914.

Attest:

Inventor:
Herman H. Doehler
by Frank P. Wentworth
his Atty.

UNITED STATES PATENT OFFICE.

HERMAN H. DOEHLER, OF BROOKLYN, NEW YORK, ASSIGNOR TO DOEHLER DIE CASTING COMPANY, OF BROOKLYN, NEW YORK, A CORPORATION OF NEW YORK.

BEARING.

1,121,904.   Specification of Letters Patent.   Patented Dec. 22, 1914.

Application filed June 12, 1912. Serial No. 703,296.

*To all whom it may concern:*

Be it known that I, HERMAN H. DOEHLER, a citizen of the United States, residing in the borough of Brooklyn, in the city of New York, county of Kings, and State of New York, have invented certain new and useful Improvements in Bearings, of which the following is a specification, reference being had therein to the accompanying drawings, which form a part thereof.

My invention relates to bearings, and more particularly to a type of bearing adapted for use in automobiles.

The main object of my invention is to provide a bearing containing Babbitt or similar bearing metal in a housing, which Babbitt metal and its housing will be so arranged and united as to form a unitary structure and prevent any displacement of the Babbitt metal, or the spreading or disruption thereof through the load thereon.

A further object is to provide a bearing adapted to be assembled in a machine without refinishing, which bearing will contain Babbitt metal so lodged in a supporting housing as to prevent the spreading of the Babbitt metal relative to said housing, while at the same time insuring the engagement of the Babbitt metal with the shaft at all times.

A still further object is to provide a bearing containing a housing, and Babbitt metal carried thereby so as to form an integral part of the bearing, the different parts of the bearing being so constructed and arranged as to be capable of assembling in a machine without the necessity of fitting to the shaft by the ordinary methods. And a still further object is to provide a bearing having all of the characteristics of Babbitt metal bearings as to exactness of finish, while not being subject to deterioration through the crushing strains thereon.

The invention consists in a bearing comprising a housing adapted to be fitted to a shaft, said housing having a recess on the inner face thereof the walls of which extend substantially perpendicularly to the inner face of said housing, and a mass of Babbitt metal contained within said recess, whereby said Babbitt metal will serve as a bearing for the shaft, and the walls of said recess will prevent the spreading of said Babbitt metal; and in such other novel features of construction and combination of parts as are hereinafter set forth and described, and more particularly pointed out in the claims hereto appended.

Referring to the drawings:—

Figure 2:
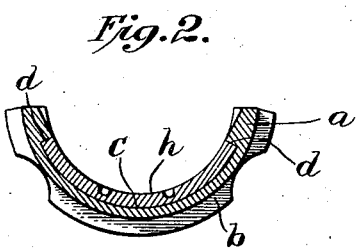
Figure 3:
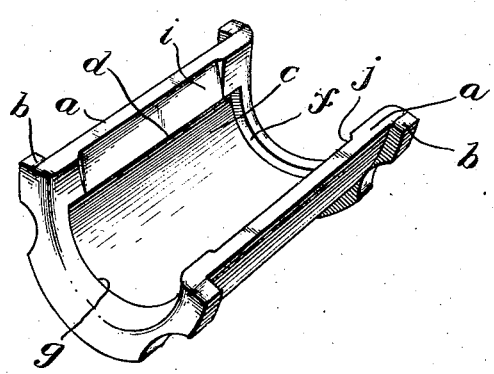
Figure 4:
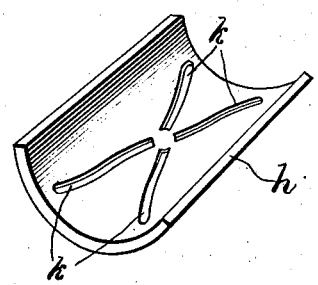

Figure 1 is a plan view of a bearing embodying my invention; Fig. 2 is a cross section thereof on the line 2—2 of Fig. 1; Fig. 3 is a perspective view of the outer housing; and Fig. 4 is a perspective view of the Babbitt metal lining adapted to be fitted to the recess in said outer housing.

Like letters refer to like parts in each of the several views.

Heretofore it has been the practice to make bearings or journals for the shafts of low power engines used in automobiles and for similar light work, entirely of Babbitt metal, made to size and finished so as to be assembled in the engine without special fitting to the shaft. It has been found by experience, however, that bearings or journals made entirely of Babbitt metal in the manner above referred to, while satisfactory in many respects, are not entirely satisfactory, as they are a source of sufficient trouble to make them undesirable because of their liability to spread and break down under the crushing strains of continued use. The disruption of the bearing or journal usually occurs first upon the ends thereof, and quite frequently the cutting of the shaft results from the destruction or partial destruction of the bearing or journal. By my improved bearing or journal, I obviate this difficulty by providing in a unitary structure a bearing surface or body composed of Babbitt metal so combined and inclosed in a metal having relatively greater tensile strength, as to eliminate any possibility of the crushing, compression or disruption of the Babbitt metal or the displacement thereof relative to the other metal.

In my improved bearing, the Babbitt forms a constituent part of a finished bearing adapted to be assembled in a machine in the same manner as the all Babbitt metal bearings, and the manner of associating the component parts of the bearing is such as to prevent any possible displacement of the Babbitt metal either before or after it is assembled in the machine.

In the embodiment of my invention shown in the drawings, *a* indicates an outer shell or housing composed of brass and having a curved inner face of 180 degrees, the housing in cross section being in the form of a semi-circle. This housing is provided with the ordinary holding flanges *b* upon the ends thereof, and is made in its entirety of brass which is itself an anti-friction metal having in addition to greater tensile strength greater density than Babbitt metal while having poorer wearing qualities. Within the inner face of the housing *a* is a recess *c* which is preferably rectangular, the walls of this recess being perpendicular to the inner face of the housing *a* so that these walls will serve to retain the Babbitt metal in the recess and prevent any displacement thereof under any conditions. The walls *d* and *e* adjacent to the sides of the housing *a* are on substantially the same plane, and the walls *f* and *g* adjacent to the ends thereof are substantially parallel.

Seated within the recess *c* with its edges engaging the walls *d e f g* is a rectangular lining *h* of Babbitt metal which metal is assembled with the housing.

Adjacent to the walls *d e* are ordinary oil pockets *i j*, and the lining *h* of Babbitt metal is provided with ordinary oil grooves *k*. In order to secure greater density in the Babbitt metal line *h*, I form this lining from sheets of rolled metal formed and cut to size, these sheets being inserted within the recess *c* and pressed to place, said lining having a close driving fit within the walls of said recess. When so fitted to the housing *a*, said lining *h* is held firmly in place by the walls *d e f g*, it being impossible to displace same without destroying the housing *a*. The thickness of the sheet from which the lining *h* is made preferably corresponds with the depth of the recess *c*, although this dimension is not essential.

I have found by actual use that a bearing with journals composed of the housing *a* and lining *h*, as herein described, will stand up and give highly satisfactory service under ordinary conditions of use, and that the greater tensile strength of the housing *a* has the effect of preserving the form of the lining *h* and preventing its disruption in such a manner as to subject the shaft to cutting or burning. Furthermore, actual experience and use has demonstrated that while the housing *a* when made of brass has greater tensile strength than its lining *h*, continued wear upon the bearing will result in the finishing of the bearing surface and a substantially uniform wear upon both the lining and the housing, the base of the housing being, as stated, itself an anti-friction metal, and wearing more rapidly under the ordinary conditions of use than the Babbitt metal.

The continuous walls of the recess *c* combined with the curve of the housing *a* serves to hold the lining against any possible movement or any possible expansion under pressure, and therefore imparts to the bearing all of the advantages of a solid brass bearing coupled with those of the more readily destructible all Babbitt metal bearings.

A bearing such as I have herein described may be readily produced, and while its cost of production is greater than that of the ordinary Babbitt metal bearing, it is less than that of the ordinary brass bearing, and the bearing herein described is more efficient in use than the latter.

It is not my intention to limit the invention to the precise configuration of the parts shown in the accompanying drawings, it being apparent that such may be varied without departing from the spirit and scope of the invention.

Having described my invention, what I claim as new and desire to have protected by Letters Patent, is:—

1. A bearing comprising a housing adapted to be fitted to a shaft, said housing having a recess in the inner face thereof the walls of which extend substantially perpendicularly to the inner face of said housing, and a previously compacted sheet of Babbitt metal contained within said recess, whereby said Babbitt metal will serve as a bearing for a shaft, and the walls of said recess will prevent the spreading of said Babbitt metal, said housing being composed of an anti-friction metal having greater tensile strength than Babbitt metal.

2. A bearing comprising a housing semi-circular in cross section so as to fit a shaft, said housing having a recess in the concave side thereof, the walls of which recess extend adjacent to the edges of said housing and are substantially perpendicular to the inner face thereof, and a sheet of Babbitt metal, compacted by being rolled, having a close driving fit within said recess, whereby said Babbitt metal will serve as a bearing for a shaft, and the walls of said recess will prevent the spreading of said Babbitt metal.

In witness whereof, I have hereunto affixed my signature, in the presence of two subscribing witnesses, this 10th day of June, 1912.

HERMAN H. DOEHLER.

Witnesses:
F. T. WENTWORTH,
EUGENE WENING.